(12) United States Patent
Brim, III

(10) Patent No.: US 8,181,351 B1
(45) Date of Patent: May 22, 2012

(54) PRUNING CLIPPER FOR DISPENSING A CHEMICAL TREATMENT

(76) Inventor: J. Croswell Brim, III, Marietta, GA (US)

( * ) Notice: Subject to any disclaimer, the term of this patent is extended or adjusted under 35 U.S.C. 154(b) by 555 days.

(21) Appl. No.: 12/237,964

(22) Filed: Sep. 25, 2008

Related U.S. Application Data

(60) Provisional application No. 60/975,019, filed on Sep. 25, 2007.

(51) Int. Cl.
*A01G 3/00* (2006.01)
(52) U.S. Cl. .............................. 30/123.3; 30/131; 47/1.7
(58) Field of Classification Search ................ 30/123.3, 30/131, 132, 134; 47/1.7; 83/169
See application file for complete search history.

(56) References Cited

U.S. PATENT DOCUMENTS

| | | | |
|---|---|---|---|
| 773,743 A | 11/1904 | Von Hoffmann | |
| 954,126 A * | 4/1910 | McAllister | 47/57.5 |
| 1,056,046 A | 3/1913 | Myers | |
| 1,640,635 A * | 8/1927 | Atkins | 47/1.7 |
| 1,756,129 A * | 4/1930 | Nishinaka | 184/82 |
| 2,747,330 A * | 5/1956 | Simpkins | 47/1.7 |
| 2,789,396 A * | 4/1957 | Jernander et al. | 47/1.5 |
| 2,870,573 A | 1/1959 | Scadden | |
| 3,832,772 A * | 9/1974 | Sumida | 30/392 |
| 4,073,059 A | 2/1978 | Wallace | |
| 4,219,963 A | 9/1980 | Mullett | |
| 4,341,016 A | 7/1982 | Harrison | |
| 4,602,432 A | 7/1986 | Vosbikian | |
| 4,783,907 A | 11/1988 | Ravaux | |
| 4,891,882 A | 1/1990 | Bloom et al. | |
| 5,088,198 A | 2/1992 | Drusiani | |
| 5,133,130 A * | 7/1992 | Podolsky | 30/41 |
| 5,161,308 A * | 11/1992 | Hayward | 30/123.3 |
| 5,263,254 A | 11/1993 | Orthey | |
| 5,471,745 A | 12/1995 | Wendell | |
| 5,606,822 A | 3/1997 | Dearhammer | |
| 5,743,018 A | 4/1998 | Wang | |
| 6,523,264 B1 | 2/2003 | Albert et al. | |
| 6,532,668 B1 | 3/2003 | Bloom et al. | |
| 6,675,481 B2 | 1/2004 | Wu | |
| 6,952,876 B2 | 10/2005 | Frazer | |
| 7,331,108 B2 * | 2/2008 | Rondinone | 30/123.3 |

OTHER PUBLICATIONS

Felco 19 Operating Instructions, believed to be published and available for purchase in the United States as of Mar. 16, 2006. Felco 19 Pruning Shears website, http://www.felco.com/felco/pages/product.page?name=FELCO%2019, , believed to be published and available in the United States as of Mar. 16, 2006.
Felco 19 Product Guide, believed to be published and available in the United States as of Mar. 16, 2006.

\* cited by examiner

*Primary Examiner* — Boyer D Ashley
*Assistant Examiner* — Omar Flores Sanchez
(74) *Attorney, Agent, or Firm* — Smith, Gambrell & Russell

(57) ABSTRACT

A pruning clipper includes a pair of handles each having a distal end and a proximal end, with the handles being pivotally connected to each other close to the proximal ends of the handles. A first blade is connected to the proximal end of one of said handles, and a second blade is connected to the proximal end of the other handle. A chemical storage tank is connected to the distal end of one of said handles for storing a chemical to be selectively applied to vegetation. A bulb is connected to the proximal end of one of the handles, with the bulb being connected to the tank using a first connecting tube. A dispensing member extends along the side of one of the blades and beyond the blade to a dispersion point, and the dispensing member is connected to the bulb using a second connecting tube. As a result, the user will be able to cut the vegetation as desired using the clippers, and selectively dispense an herbicide as desired by the user.

14 Claims, 15 Drawing Sheets

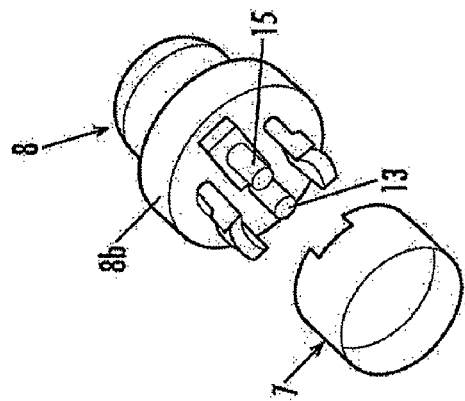
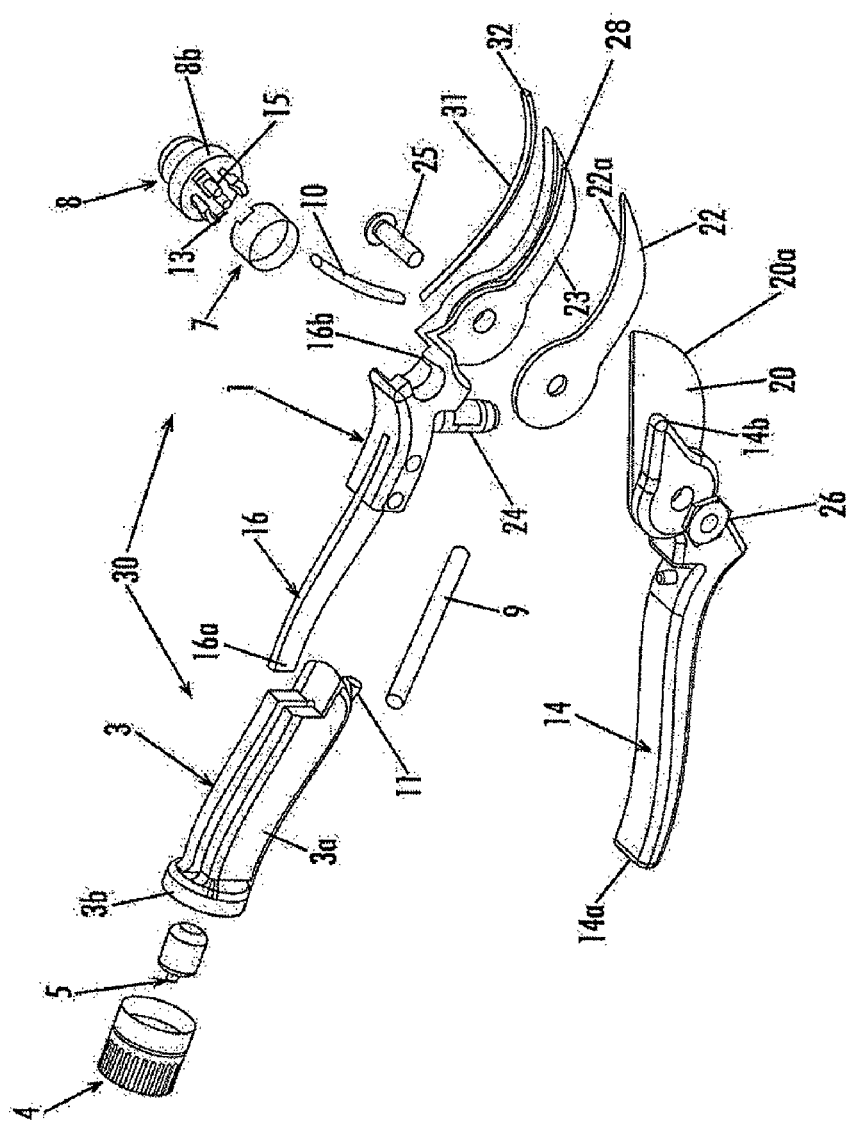
Fig. 2b
Fig. 2a

PRUNING CLIPPER FOR DISPENSING A CHEMICAL TREATMENT

CROSS REFERENCE TO RELATED PATENT APPLICATION

This non-provisional application claims priority from provisional patent application 60/975,019, filed on Sep. 25, 2007, said application being relied upon and incorporated herein by reference.

BACKGROUND OF THE INVENTION

A variety of pruning shears are known and commonly used in cutting and trimming plants and trees, such as U.S. Pat. Nos. 4,073,059 and 5,743,018. While these devices are useful to remove unwanted growth, they do not operate to prevent future growth on or near the plant or tree, and thus require the user to monitor the area and return to cut additional unwanted growth.

SUMMARY OF THE INVENTION

A pruning clipper for dispensing a chemical treatment, such as a herbicide, on plants is disclosed herein. The clipper includes a pair of handles each having a distal end and a proximal end, with the handles being pivotally connected to each other close to the proximal ends of the handles. A first blade is connected to the proximal end of one of said handles, and a second blade is connected to the proximal end of the other handle. A chemical storage tank is connected to the distal end of one of said handles for storing a chemical to be selectively applied to vegetation. A bulb is connected to the proximal end of one of the handles, with the bulb being connected to the tank using a first connecting tube. A dispensing member extends along the side of one of the blades and beyond the blade to a dispersion point, and the dispensing member is connected to the bulb using a second connecting tube. As a result, the user will be able to cut the vegetation as desired using the clippers, and selectively dispense an herbicide as desired by the user.

DESCRIPTION OF THE DRAWINGS

FIG. 2a is an exploded view of the pruning clipper;
FIG. 2b is a perspective view of the bulb and bulb insert used with the pruning clipper of FIG. 2.

DETAILED DESCRIPTION OF THE INVENTION

Figure 1:
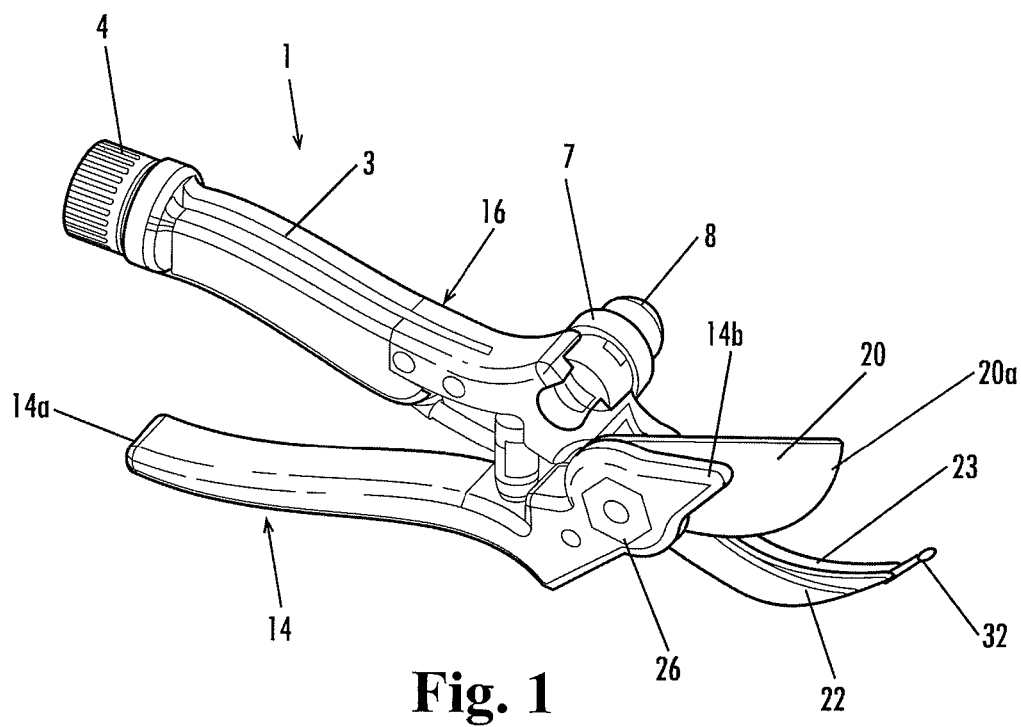
FIG. 1 is a perspective view of an improved pruning clipper.

Looking to the attached Figures, an improved pruning clipper or pruning shear 1 providing a means for dispensing a chemical treatment is illustrated. Namely, FIGS. 1 through 3b show the pruning clipper 1 having first and second arm handles 14, 16 that are pivotally connected to each other via a connecting member 25, such as a bolt, screw, or similar means, connected to a nut 26 or similar mechanism. The first arm handle 14 has a distal end 14a and a proximal end 14b, with a first blade 20 connected to the proximal end 14b of the first arm handle 14. Likewise, the second arm handle 16 has a distal end 16a and a proximal end 16b, with a second blade 22 and blade mount 23 connected to the proximal end 16b of the second arm handle 16. The second blade 22 and blade mount 23 have similarly designed peripheral shapes, with the blade mount 23 further including a track or channel 28 along one surface of the blade mount 23, as described herein. The blades 20, 22 may be conventional hook blades having respective cutting edges 20a, 22a, or any other type of blade suitable for cutting objects such as plants or tree limbs.

A spring 24 or similar mechanism is positioned between the handles 14, 16 to apply a outwardly-directed spring pressure A forcing the handles 14, 16 apart in a resting position. Looking to FIG. 1, the spring 25 is positioned between the distal ends 14a, 16a of the handles 14, 16 and the connecting member 25. Looking to FIG. 3a, the user will apply an inwardly-directed cutting pressure B on the handles 14, 16, which is substantially opposite to spring force A, to draw the handles 14, 16 toward each other as well as the blades 20, 22 attached to the handles 14, 16. As the blades 20, 22 are drawn together, they will cut any plants or other object positioned between the blades 20, 22. When force or pressure B is removed from the handles 14, 16, the spring 24 will direct the handles 14, 16 in direction A to the resting position.

Looking to FIGS. 3a-14, a chemical applicator 30 is affixed to the second arm handle 16 of the clipper 1 to allow the user to selectively distribute an herbicide or some other chemical to vegetation in the general proximity of work, such as a weed or brush material near the item being cut. As shown in FIG. 2a, the chemical applicator 30 includes a tank or similar container 3 that is affixed to the distal end 16a of the second arm handle 16 and a squeezable or depressible bulb 8 that is also fitted to the second arm handle 16 via a bulb insert 7. Looking to FIG. 2b, the bulb 8 is a squeezable rubber or flexible member that is connected to a base 8b. An input connector 13 and an output connector 15 traverse through and extend from the base 8b to allow fluids to pass into and out of the bulb 8. It is to be noted that the bulb 8 may take any shape in addition to the shape illustrated in the attached drawings, with the function of the bulb 8 acting as a plunger to allow a user to draw a chemical from the tank 3 and force it out through a distribution conduit 31 described herein.

Figure 3A:
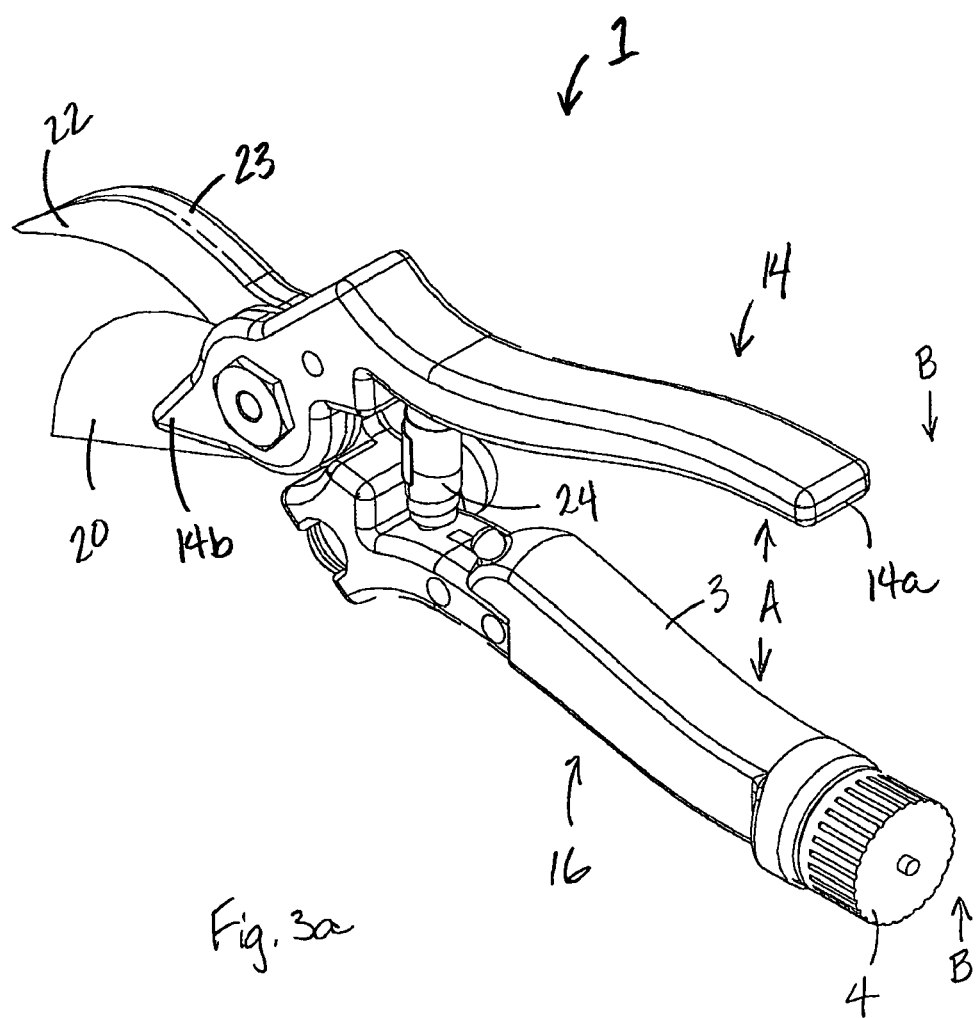
FIGS. 3a, 3b and 4 are a rear perspective views of the pruning clipper.
Figure 3B:
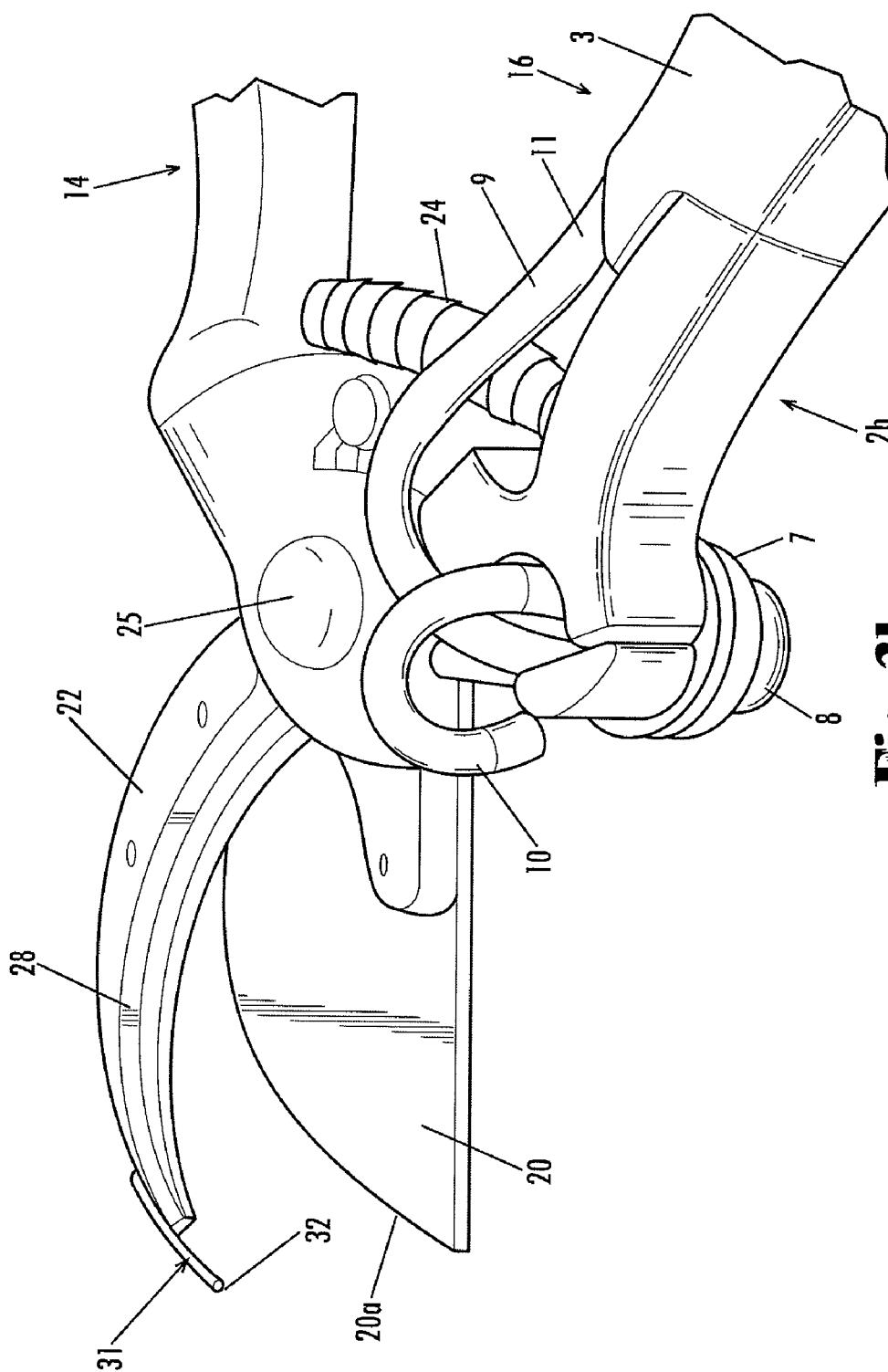
Figure 4:
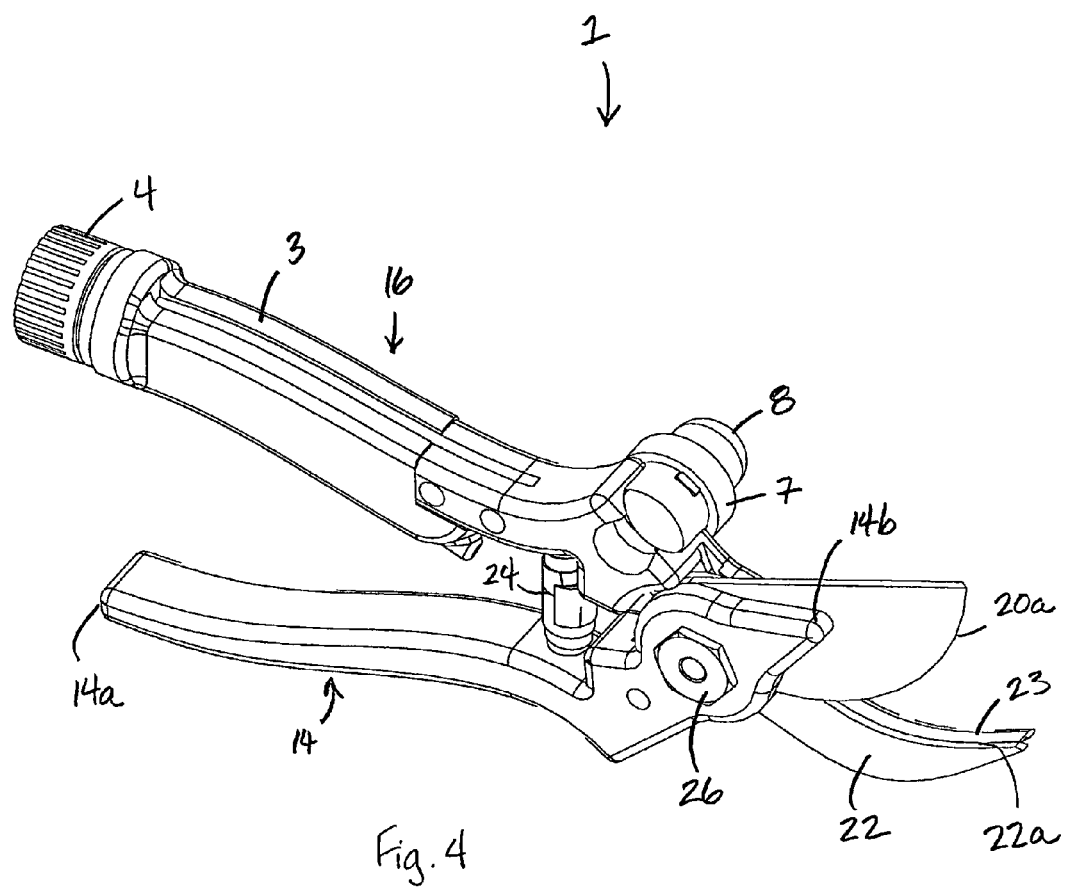
Figure 5:
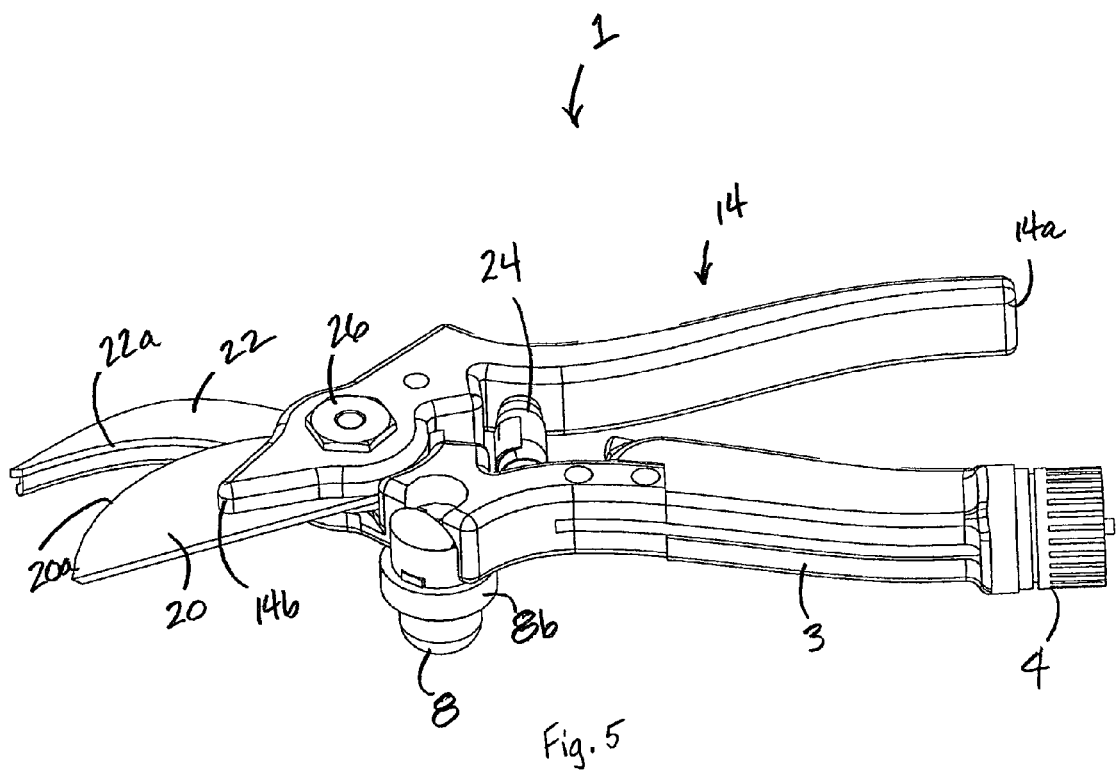
FIG. 5 is a bottom perspective view of the pruning clipper.
Figure 6:
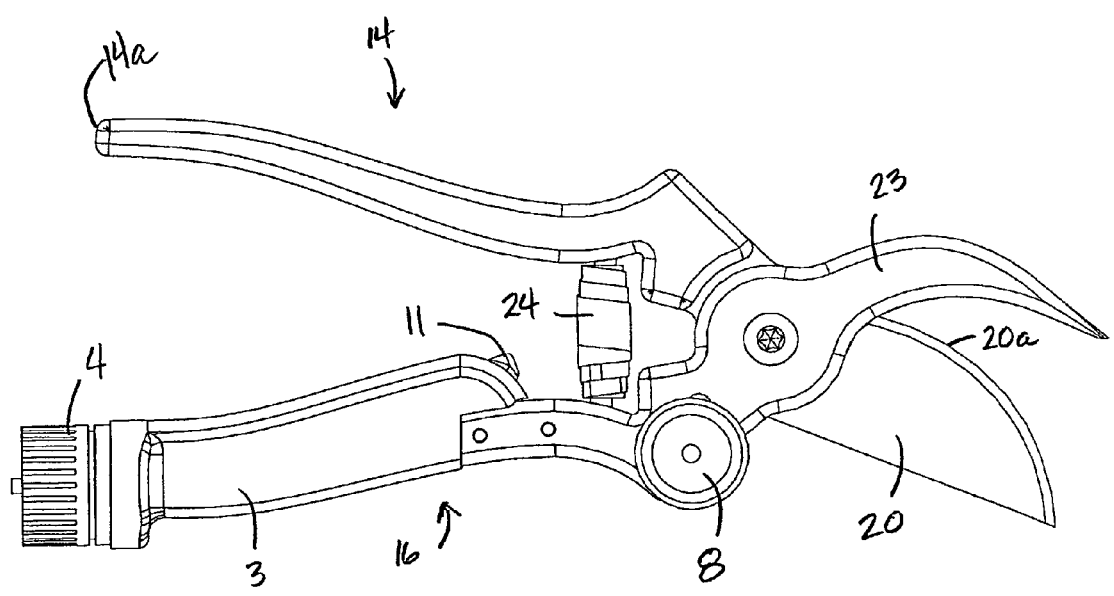
FIG. 6 is a side elevational view of the pruning clipper.
Figure 7:
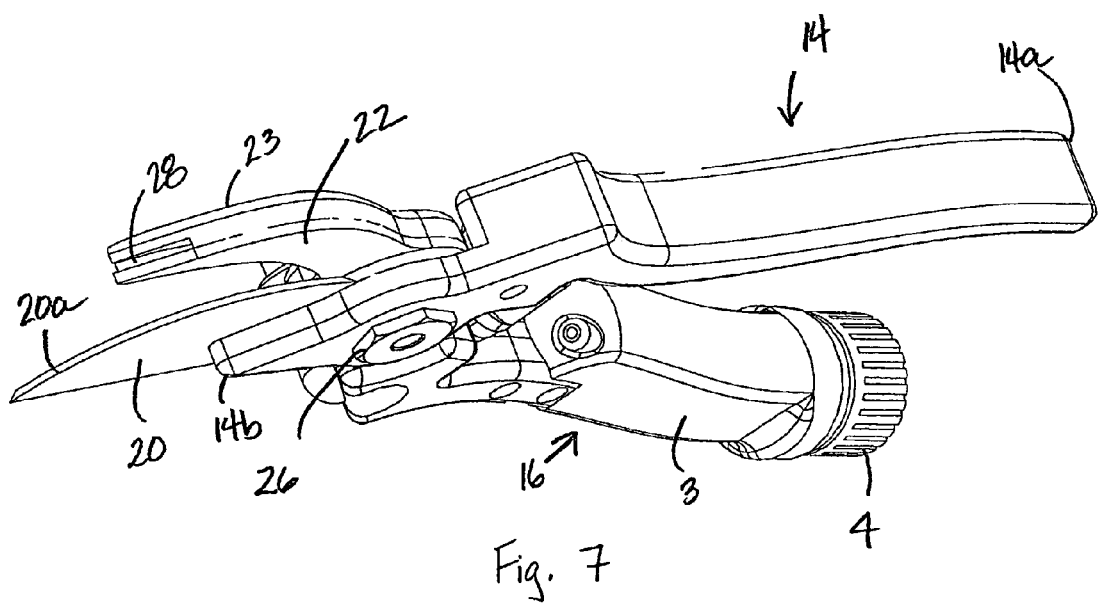
FIG. 7 is a top perspective view of the pruning clipper.
Figure 8:
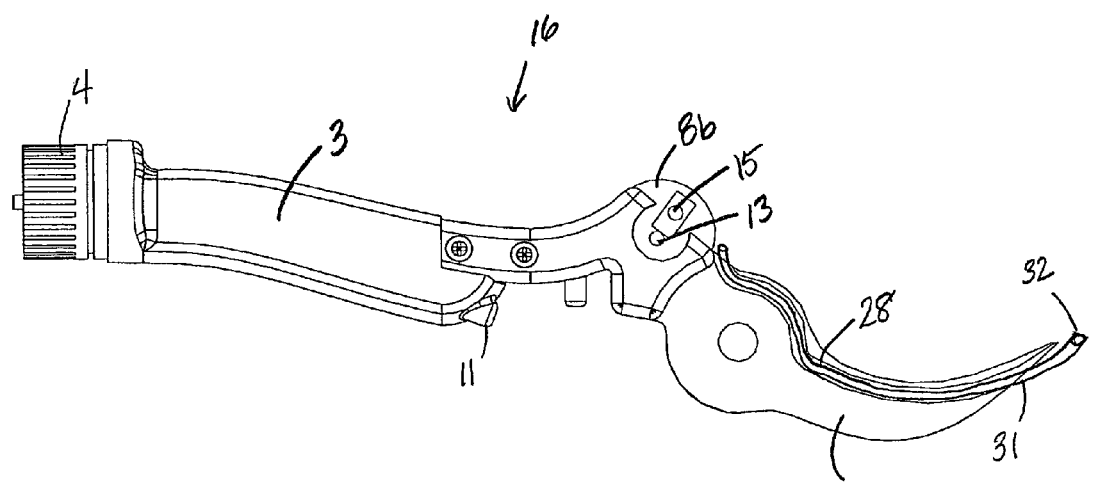
FIG. 8 is a bottom view of the pruning clipper.
Figure 9:
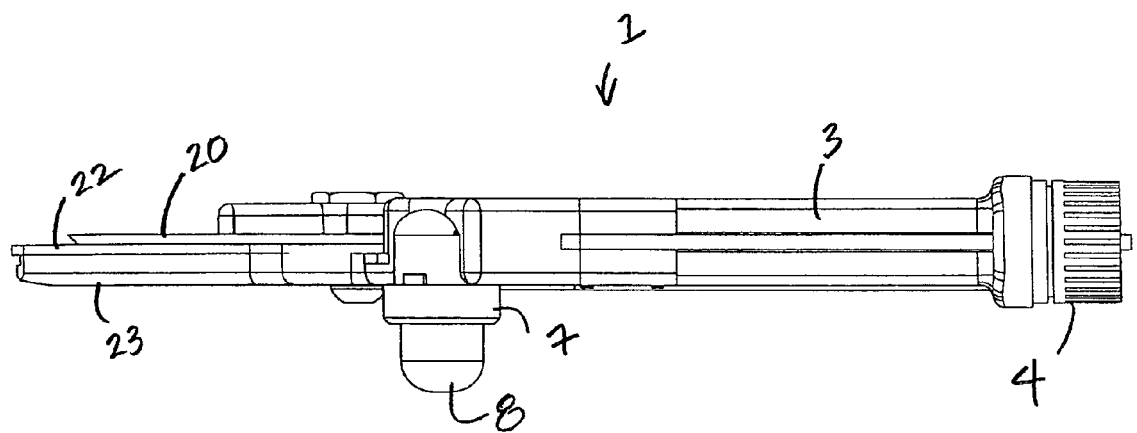
FIG. 9 is a side elevational view of a first handle of the pruning clipper.
Figure 10:
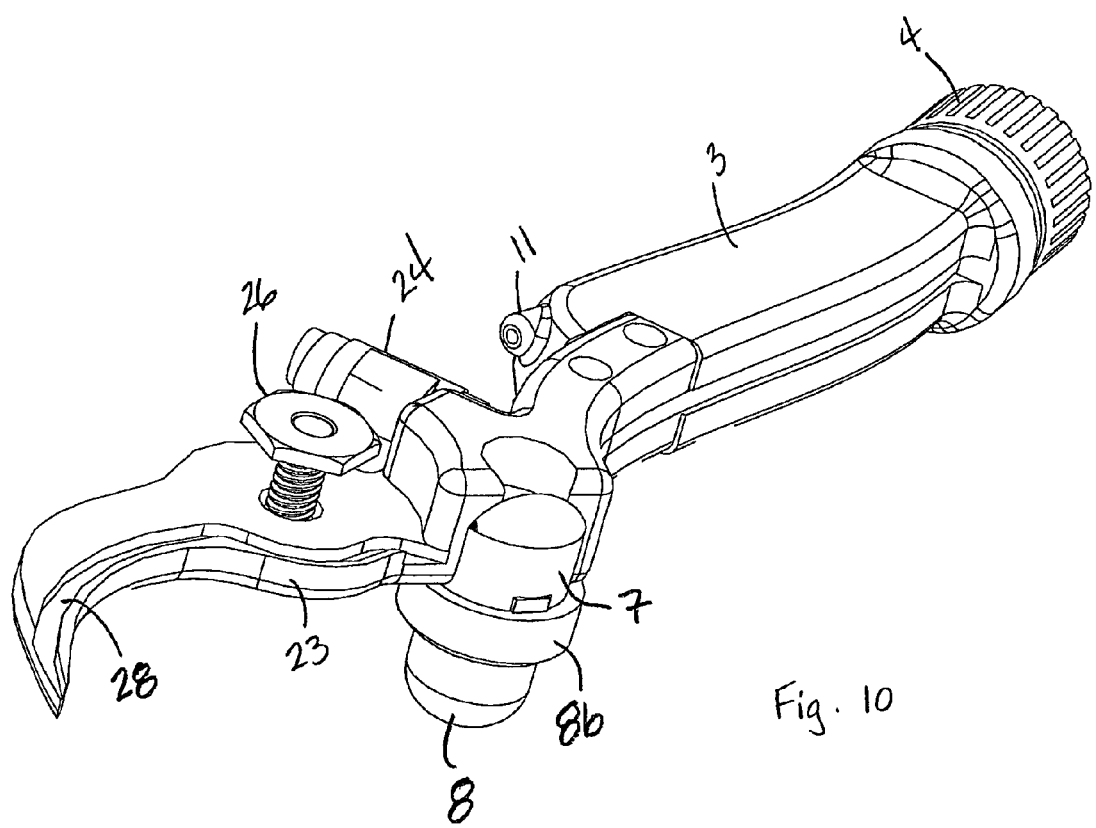
FIG. 10 is a perspective view of the handle of FIG. 9.
Figure 11:
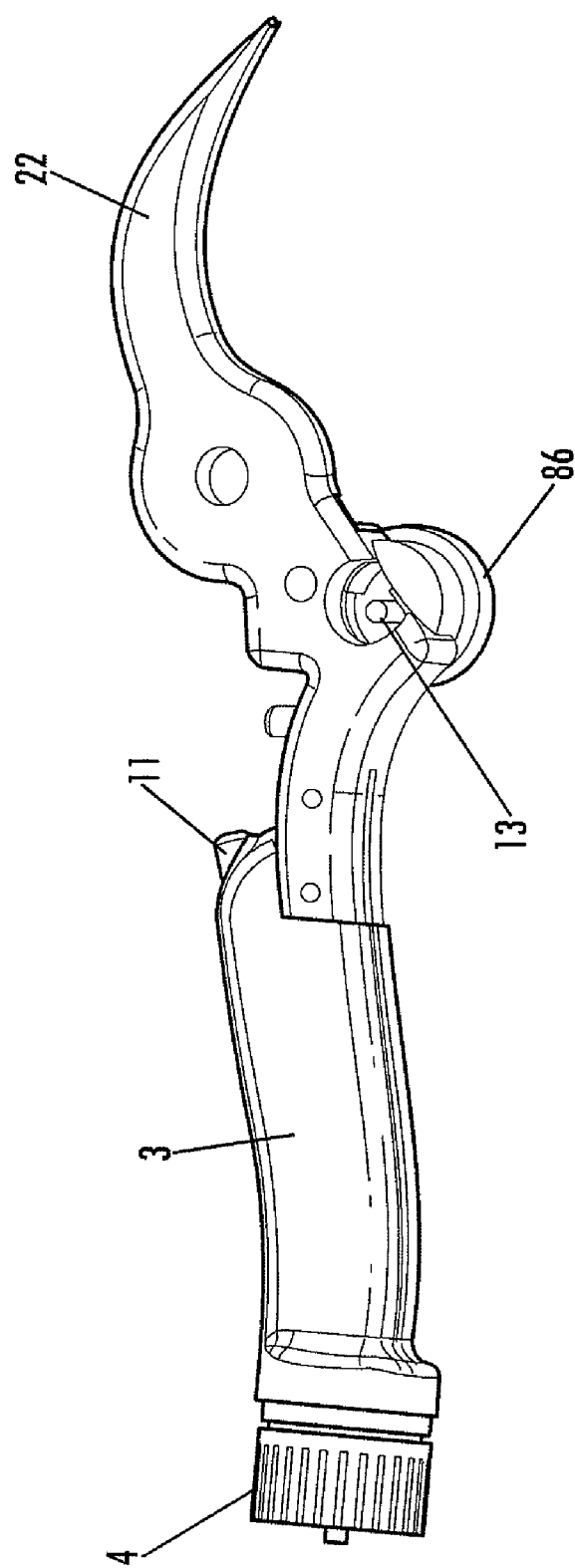
FIG. 11 is a side elevational view of a second handle of the pruning clipper.
Figure 12:
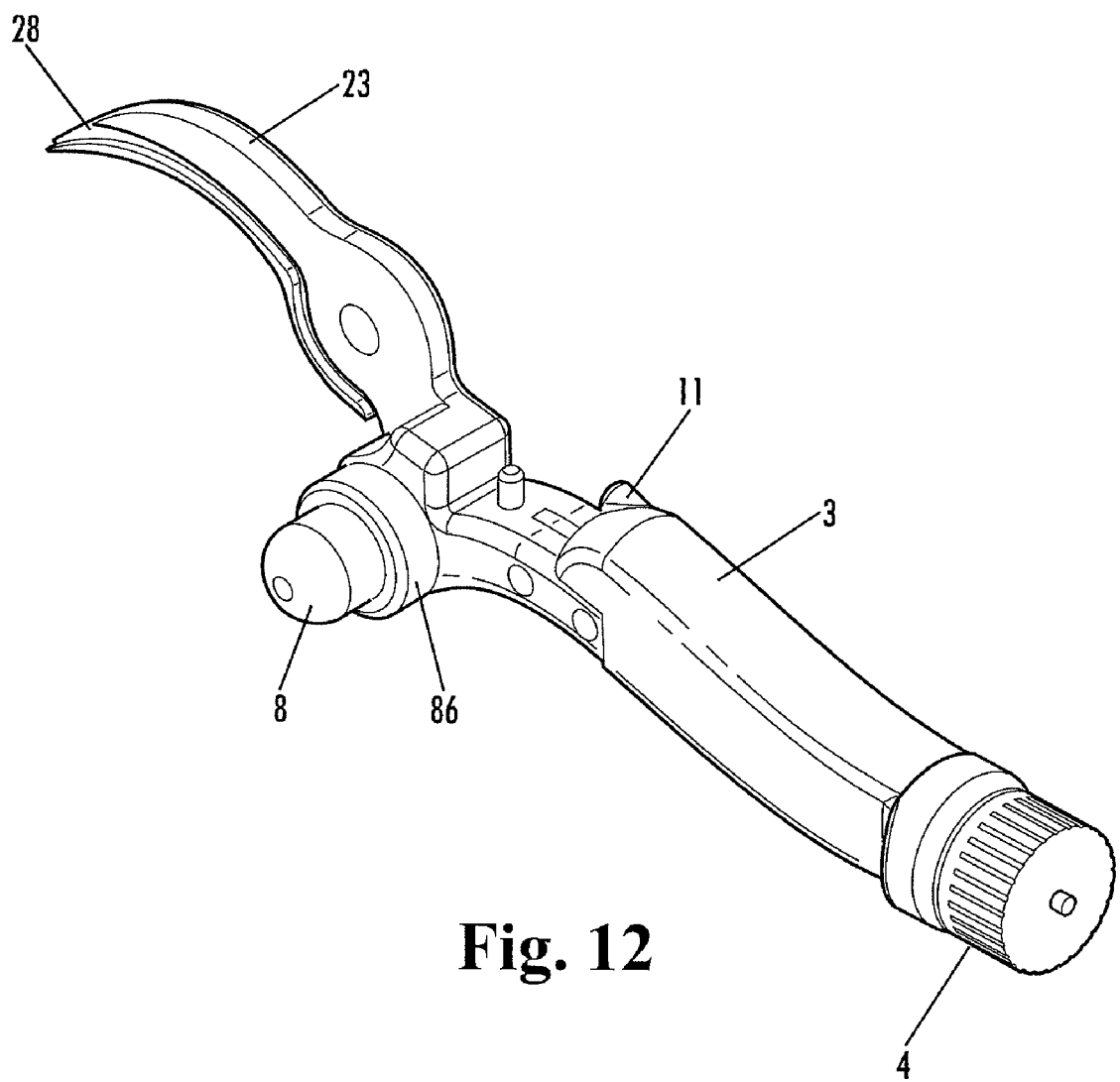
FIG. 12 is a top perspective view of the handle of FIG. 11.
Figure 13:
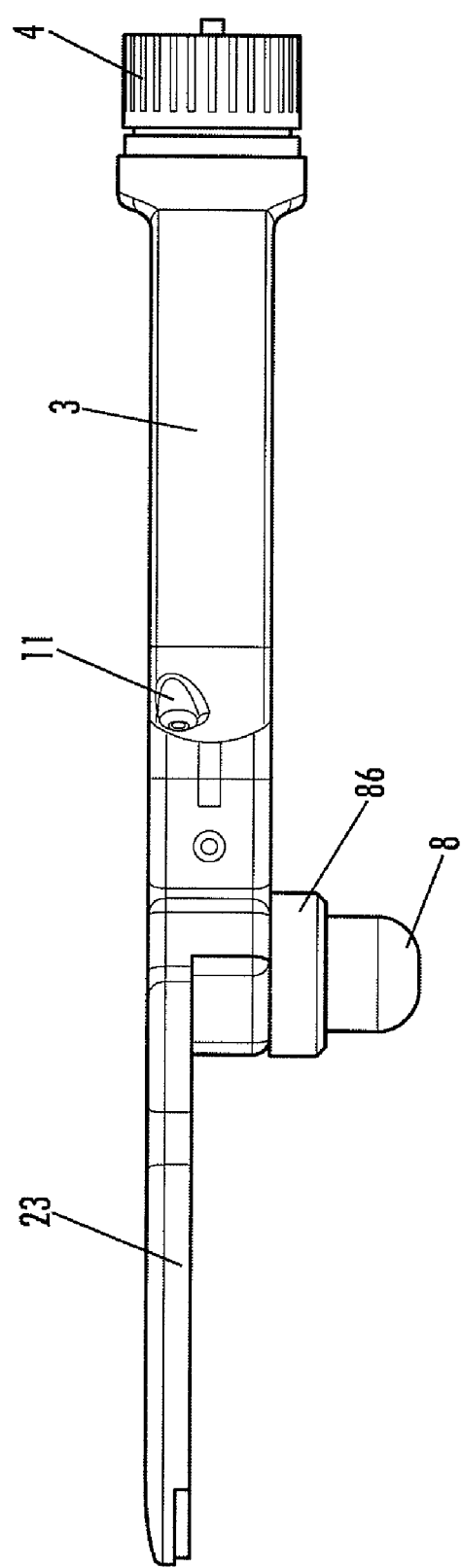
FIG. 13 is a top plan view of the handle of FIG. 11.
Figure 14:
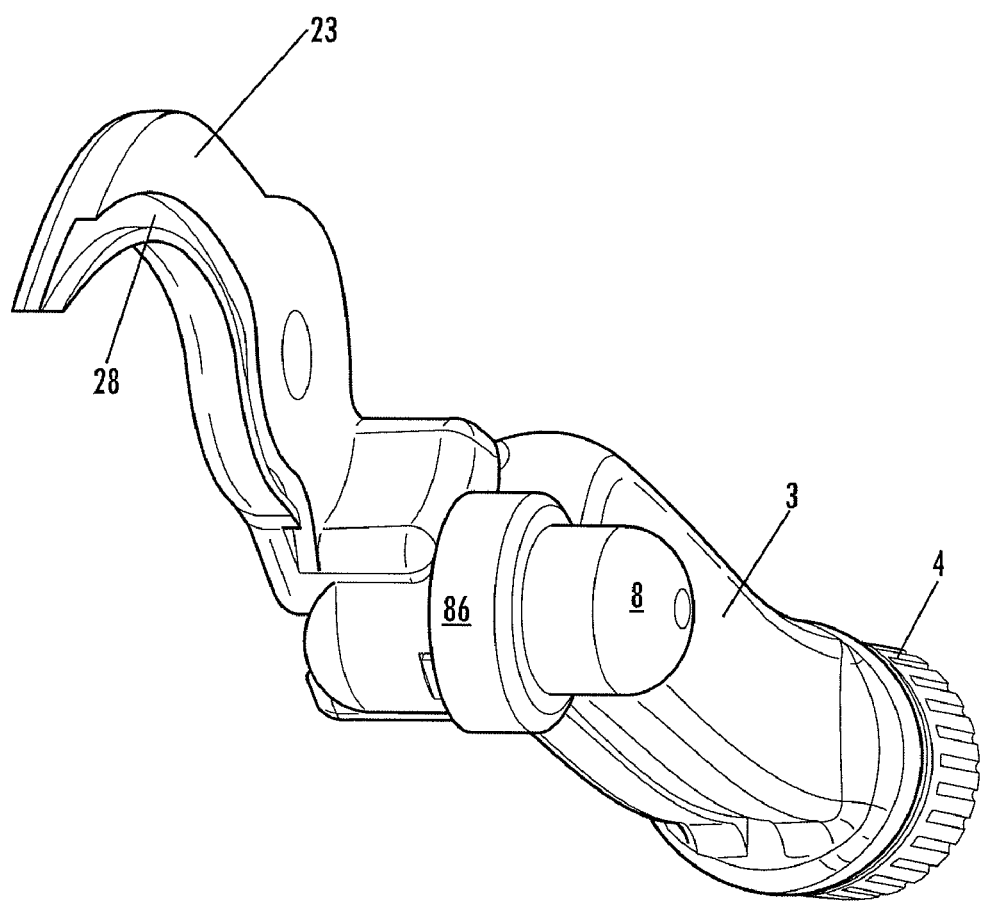
FIG. 14 is a front perspective view of the first handle.

Referring to FIG. 2a, the tank 3 includes a hollow housing 3a designed to hold a reservoir of a preferred chemical, such as an herbicide, to be used as desired for a particular application (e.g., using the chemical to kill weeds and undesired plant life). The housing 3a that has an open end having a threaded outer surface to receive cap or bottle top 4. Opposite the open end is a substantially closed end with the tank output connector 11 extending therefrom. Looking to FIG. 3b, the tank 3 is connected to the bulb 8 via a flexible input tube or hose 9; namely, the tube 9 is connected to output connector 11 of the tank 3 associated with the base of the bulb 8 and to an input connector 13 connected to the base 8b of the bulb 8. A second flexible output tube or house 10 is also connected to an output connector 15 on the base 8b of the bulb 8. In the embodiments illustrated in the attached drawings, the output tube 10 may be joined with a distribution conduit or tube 31 that extends along the outer surface or traversing through one of the blades 22 of the clipper 1 to a distribution point 32, although the output connector 12 can take the place of the distribution conduit 31 if desired. Further, the embodiment shown in FIG. 3b illustrates the input tube 9 and the output tube 10 as extending uncontained from the clipper 1, although it is foreseen that such elements may be enclosed by a housing or molded within the one of the handles 14, 16 by a person of ordinary skill in order to protect the tubes 9, 10 from damage and to maintain a secure connection with the base 8b of the bulb 8.

The distribution conduit 31, which may be connected to the output tube 10, is hollow, and may be made of a metal or other material that is more rigid than the flexible output connector 12. Looking to FIGS. 2a and 3b, the distribution conduit 31 is positioned relative to the blades 20, 22 as desired, with the embodiment illustrated extending beyond the blades 20, 22 so that the chemical distribution point 32 is not proximate the blades 20, 22, and therefore the chemical will not accidentally engage the blades 20, 22. More particularly, looking to FIG. 10, the blade mount 23, which adjoins the second blade 22, defines the channel 28 through with the distribution or application conduit 31 travels to the distribution point 32. An advantage to this design is that the chemical being dispersed will not engage the blades 20, 22, thus the user will not inadvertently apply the chemical to live and desirable plant.

Referring back to FIG. 2a, a check valve 5 is positioned in the housing 3a proximate the cap 4, and it is affixed thereto to prevent unwanted leakage of the chemical from the tank 3. That is, the check valve 5 is a conventional one-way valve that allows the user to distribute the liquid into the tank 3 but prevents any of the liquid from exiting the tank 3 through the valve 5. Thus, in operation, the user will remove the cap 4 from the tank 3. Once the tank 3 is open, the user can distribute the desired chemicals (e.g., herbicide) into the tank 3 through the valve 5.

Looking to FIGS. 8 through 14, the second arm handle 16 includes a tank 3 that stores the herbicide for applying to plants that are cut by the clippers 1. That is, when desired, the user will be able to dispense a chemical at a specific location by positioning the distribution point 32 of the clipper 1 at the desired location. The user will push the bulb 8 to expel the air or fluid contained therein. As the bulb 8 is released, the fluid stored in the tank 3 will be drawn into the bulb 8 through input hose 9. It may take more than one push of the bulb 8 to draw the fluid from the tank 3. Once the fluid is drawn into the bulb 8 an additional force will disperse the chemical at the distribution point 32. As the bulb 8 is released, chemicals from the tank 3 will be drawn into the bulb 8 through the input tube 9. With an additional push, the chemicals will be transmitted from the bulb 8 through the output tube 10 to the distribution conduit 31 and ultimately to the distribution point 32 at the desired location, which presumptively could be onto the plant or weed being trimmed. Thus, the user can apply the herbicide as desired, such as to the plant that is being cut by the clipper 1.

Based on this process, it is clear that the clipper 1 does not dispense fluid every time the clipper 1 is used to trim plants. Rather, the chemicals are dispensed only upon pressing the bulb 8 on the side of the clipper 1. Therefore, the clippers 1 can be utilized to cut good plant material without fear of dispersing herbicide on the good plant, while also being used to cut undesirable material with the application of herbicide. Moreover, minimal herbicide will be used with this chemical applicator 30 corresponding to the size of the bulb 8. Thus, it is not intended for the entire blade 22 to be saturated with herbicide prior to the cut. These clippers 1 are small without a large appendage attached so the clippers 1 are easy to use and can be utilized in tight spaces with flexibility.

The embodiment of pruning clippers 1 illustrated in the attached figures is considered a hand clipper. However, it is to be noted that other clippers or shears may apply the present teachings for a device to allow the clipping of plants and maintenance of growth in the surrounding area. For example, the arm handles 14, 16 may be replaced by extended poles to allow the user to reach additional areas not permitted with conventionally sized hand grips. Additionally, although the embodiment illustrates that use of a separate tank 3 affixed to the second handle 16, it foreseeable that other embodiments may be implemented, such as forming the handle 16 with the reservoir 3 therein.

Having thus described exemplary embodiments of a PRUNING CLIPPER FOR DISPENSING A CHEMICAL TREATMENT, it should be noted by those skilled in the art that the within disclosures are exemplary only and that various other alternatives, adaptations, and modifications may be made within the scope of the present invention. Accordingly, the invention is not limited to the specific embodiments as illustrated herein, but is only limited by the following claims.

The invention claimed is:

1. An improved pruning clipper comprising:
   a first handle having a distal end and a proximal end;
   a first blade connected to said proximal end of said first handle;
   a second handle having a distal end and a proximal end, said second handle pivotally connected to said first handle;
   a second blade connected to said proximal end of said second handle, said second blade extending from said proximal end of said second handle to a distal cutting edge;
   a tank for containing a fluid, said tank connected to said distal end of said second handle;
   a bulb connected to said second handle, said bulb connected to said tank using a first connector for selectively distributing the fluid from said tank independently of the movement of said second handle; and
   a dispensing conduit extending along said periphery of said second blade to dispense the fluid at a desired location, said dispensing conduit extending beyond said distal cutting edge to distribute the fluid away from said first and second blades.

2. The pruning clipper as described in claim 1, wherein said tank comprises:
   a housing having an opening at one end and a output connector opposing said opening;
   a cap detachably attached to said housing proximate said opening; and
   a valve connected to said opening of said housing to allow a fluid to flow into said housing.

3. The pruning clipper as described in claim 1, further comprising a spring connected between said proximal end of said first handle and said proximal end of said second handle.

4. The pruning clipper as described in claim 1 wherein said bulb comprises a rubber member affixed to a base, said base connected with said second handle.

5. The pruning clipper as described in claim 1 further comprising:
   a base mount connected to said proximal end of said second handle and defining said distribution conduit extending through said channel.

6. The improved pruning clipper of claim 1 further comprising a second connecting member joining said bulb with said dispensing conduit.

7. A pruning clipper comprising:
   a pair of handles each having a distal end and a proximal end, said handles pivotally connected to each other;
   a first blade connected to the proximal end of one of said handles and a second blade connected to the proximal end of the said other handle;
   a container connected to one of said handles;
   a bulb connected to one of said handles using a base, said bulb connected to said container using a first connecting tube; and
   a distribution conduit connected with said bulb, said distribution conduit extending along the length of one of said blades;
   wherein each said blade extends from said proximal end of said corresponding handle to a distal cutting edge, said dispensing conduit extending beyond said distal cutting edge of one of said blades to distribute the fluid away from said blades.

8. The pruning clipper of claim 7 wherein said handles are pivotally joined using a connecting member and further comprising a spring positioned between said handles, said spring connected to the handles at a point between the distal ends and the connecting member.

9. The pruning clipper as described in claim 7, wherein said container comprises:
   a housing having an opening at one end and a output connector opposing said opening;
   a cap detachably attached to said housing proximate said opening; and
   a valve connected to said opening of said housing to allow a fluid to flow into said housing.

10. The pruning clipper as described in claim 7 further comprising:
    a base mount connected to said proximal end of said second handle; and
    a channel extending along said base mount, said distribution conduit extending along said channel.

11. The pruning clipper as described in claim 7 further comprising a second conduit connecting said bulb with said distribution conduit.

12. A pruning clipper comprising:
    a pair of handles each having a distal end and a proximal end, said handles pivotally connected to each other near said proximal ends of said handles;
    a first cutting member connected to the proximal end of one of said handles and a second cutting member connected to the proximal end of the said other handle;
    a channel extending along one of said cutting members;
    a chemical reservoir supported by one of said handles;
    means for plunging a liquid from said chemical reservoir, said plunging means being connected to one of said handles; and
    a distribution conduit connected with said plunging means, said distribution conduit extending within said channel along one of said cutting member to a distribution point;
    wherein said first cutting member extends from said proximal end of one of said handles to a distal cutting edge, said dispensing conduit extending beyond said distal cutting edge to distribute the fluid away from said first and second blades.

13. The pruning clipper as described in claim 12 wherein said plunging means comprises a bulb connected with one of said handles.

14. The pruning clipper as described in claim 12, wherein said chemical reservoir comprises:
    a housing having an opening at one end and a output connector opposing said opening;
    a cap detachably attached to said housing proximate said opening; and
    a valve connected to said opening of said housing to allow a fluid to flow into said housing.

* * * * *